(12) United States Patent
Morovic et al.

(10) Patent No.: US 10,291,822 B2
(45) Date of Patent: May 14, 2019

(54) COLOR MAPPING GENERATION INCLUDING APPLICATION OF A HALFTONE OPERATION ON CONTINUOUS TONE COLOR DATA

(71) Applicant: HEWLETT-PACKARD DEVELOPMENT COMPANY, L.P., Houston, TX (US)

(72) Inventors: Jan Morovic, Colchester (GB); Peter Morovic, Sant Cugat del Valles (ES); Marti Rius Rossell, Sant Cugat del Valles (ES); Juan Manuel Garcia Reyero Vinas, San Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 149 days.

(21) Appl. No.: 15/305,455

(22) PCT Filed: Apr. 25, 2014

(86) PCT No.: PCT/EP2014/058520
§ 371 (c)(1),
(2) Date: Oct. 20, 2016

(87) PCT Pub. No.: WO2015/161898
PCT Pub. Date: Oct. 29, 2015

(65) Prior Publication Data
US 2017/0064145 A1     Mar. 2, 2017

(51) Int. Cl.
*H04N 1/52*     (2006.01)
*H04N 1/60*     (2006.01)

(52) U.S. Cl.
CPC ............. *H04N 1/52* (2013.01); *H04N 1/6019* (2013.01); *H04N 1/6033* (2013.01); *H04N 1/6055* (2013.01)

(58) Field of Classification Search
None
See application file for complete search history.

(56) References Cited

U.S. PATENT DOCUMENTS

| 5,355,440 A | 10/1994 | Sayanagi et al. |
| 6,381,037 B1 | 4/2002 | Balasubramanian et al. |

(Continued)

FOREIGN PATENT DOCUMENTS

| CN | 102945556 B | 9/2015 |
| EP | 1139654 | 10/2001 |

OTHER PUBLICATIONS

Jan Morovic et al. Hans: Controlling Ink Jet Print Attributes via Neugebauer Primary Area Coverages.

(Continued)

*Primary Examiner* — Scott A Rogers
(74) *Attorney, Agent, or Firm* — HP Inc. Patent Department

(57) ABSTRACT

Certain methods of generating a color mapping are described. In one method, an output of a color halftone processing pipeline is processed so as to determine a set of Neugebauer Primary area coverage (NPac) values that are representative of the output of the color halftone processing pipeline. These NPac values are then used, together with knowledge of an original input image, to generating the color mapping.

15 Claims, 5 Drawing Sheets

(56) References Cited

U.S. PATENT DOCUMENTS

| | | | |
|---|---|---|---|
| 6,654,143 B1* | 11/2003 | Dalal | H04N 1/603 |
| | | | 347/14 |
| 7,768,672 B2 | 8/2010 | Gil et al. | |
| 8,213,055 B2* | 7/2012 | Morovic | H04N 1/6016 |
| | | | 358/2.1 |
| 8,270,032 B2* | 9/2012 | Benedicto | H04N 1/6058 |
| | | | 358/1.9 |
| 8,314,978 B2 | 11/2012 | Monga et al. | |
| 8,363,273 B2* | 1/2013 | Morovic | H04N 1/6033 |
| | | | 358/1.15 |
| 8,670,167 B2* | 3/2014 | Benedicto | H04N 1/6058 |
| | | | 358/1.9 |
| 9,584,700 B2* | 2/2017 | Morovic | H04N 1/52 |
| 9,686,444 B2* | 6/2017 | Morovic | H04N 1/6016 |
| 9,706,084 B2* | 7/2017 | Morovic | H04N 1/6033 |
| 9,756,221 B2* | 9/2017 | Morovic | H04N 1/6016 |
| 10,003,719 B2* | 6/2018 | Morovic | H04N 1/6016 |
| 2004/0263886 A1 | 12/2004 | Livens | |
| 2011/0096344 A1* | 4/2011 | Morovic | H04N 1/6033 |
| | | | 358/1.9 |
| 2011/0096364 A1* | 4/2011 | Morovic | H04N 1/52 |
| | | | 358/3.06 |
| 2012/0327477 A1 | 12/2012 | Edge | |
| 2013/0141764 A1 | 6/2013 | Nishikawa | |

OTHER PUBLICATIONS

Monga, et al. Design of Tone-Dependent Color-Error Diffusion Halftoning Systems. IEEE Transactions on Image Processing, vol. 16. No. 1. Jan. 2007.

* cited by examiner

COLOR MAPPING GENERATION INCLUDING APPLICATION OF A HALFTONE OPERATION ON CONTINUOUS TONE COLOR DATA

BACKGROUND

Imaging systems are arranged to output an image. They may comprise printing or display systems, wherein an output is either a printed or displayed image. In these cases, color data for the image may be represented in a first color space and it may be necessary to map this color data to a second color space that is used to produce the output. To do this a color mapping may be used. In a halftone imaging system, the color mapping may be followed by a halftoning process so as to reproduce a continuous tone image represented in the second color space using a series of dot shapes. This may allow the continuous tone image to be printed on a printing device with a discrete number of output drop levels. The result of this process is an output in the form of a halftone color separation. The output of any particular imaging system is dependent on the characteristics of the particular color halftone processing pipeline that is used by the imaging system.

BRIEF DESCRIPTION OF THE DRAWINGS

Various features and advantages of certain examples will be apparent from the detailed description which follows, taken in conjunction with the accompanying drawings, which together illustrate, by way of example only, a number of features, and wherein.

DETAILED DESCRIPTION

Figure 1A:
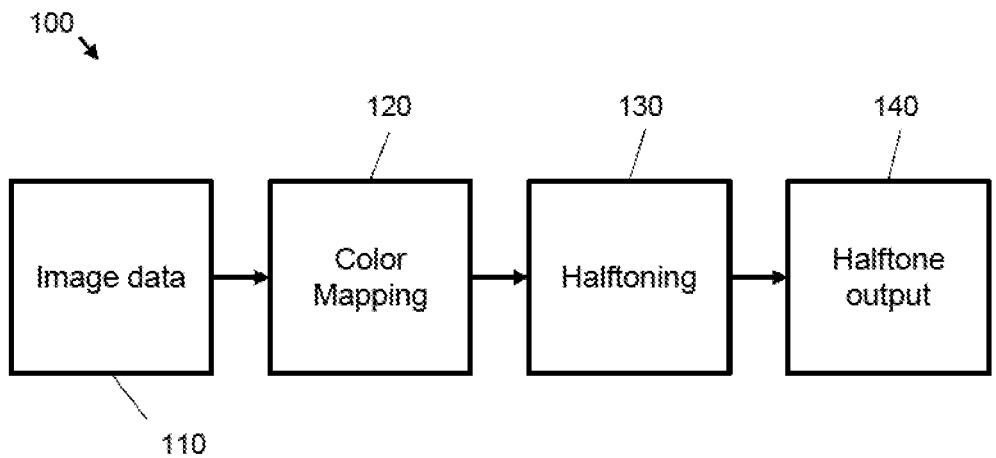
FIG. 1A is a schematic diagram of a first image processing pipeline according to an example.

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

Certain examples described herein relate to color mapping in an imaging system. Color mapping is a process by which a first representation of a given color is mapped to a second representation of the same color. Although "color" is a concept that is understood intuitively by human beings, it can be represented in a large variety of ways. For example, in one case a color may be represented by a power or intensity spectrum across a range of visible wavelengths. However, this is a high dimensionality representation and so typically a color model is used to represent a color at a lower dimensionality. For example, certain color models make use of the fact that color may be seen as a subjective phenomenon rooted in the retinal and neural circuits of a human brain. In this case, a "color" may be defined as a category that is used to denote similar visual perceptions; two colors are said to be the same if they produce a similar effect on a group of one or more people. These categories can then be modelled using a lower number of variables.

Within this context, a color model may define a color space. A color space in this sense may be defined as a multi-dimensional space, wherein a point in the multi-dimensional space represents a color value and dimensions of the space represent variables within the color model. For example, in a Red, Green, Blue (RGB) color space, an additive color model defines three variables representing different quantities of red, green and blue light. Other color spaces include: a Cyan, Magenta, Yellow and Black (CMYK) color space, wherein four variables are used in a subtractive color model to represent different quantities of colorant, e.g. for a printing system; the International Commission on Illumination (CIE) 1931 XYZ color space, wherein three variables ('X', 'Y' and 'Z' or tristimulus values) are used to model a color, and the CIE 1976 (L*, a*, b*—CIELAB) color space, wherein three variables represent lightness ('L') and opposing color dimensions (a' and b'). Certain color models, such as RGB and CMYK may be said to be device-dependent, e.g. an output color with a common RGB or CMYK value may have a different perceived color when using different imaging systems.

When working with color spaces, the term "gamut" refers to a multi-dimensional volume in a color space that represents color values that may be output by the imaging system. A gamut may take the form of an arbitrary volume in the color space wherein color values within the volume are available to the imaging system but where color values falling outside the volume are not available. The terms color mapping, color model, color space and color gamut, as explained above, will be used in the following description.

Figure 1B:
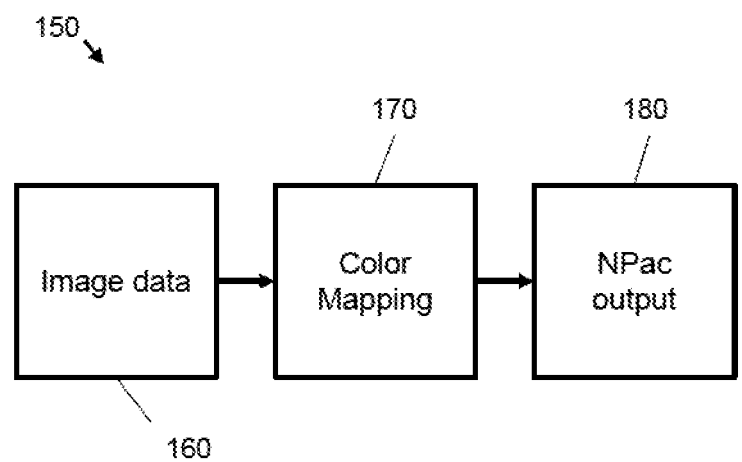
FIG. 1B is a schematic diagram of a second image processing pipeline according to an example.

FIG. 1A shows an example of a first image processing pipeline 100. Certain examples described herein emulate a first image processing pipeline 100 with a second image processing pipeline 150 as shown in FIG. 1B. In the example of FIG. 1A, image data 110 is passed into a color mapping component 120. The image data 110 may comprise color data as represented in a first color space, such as pixel representations in an RGB color space. The color mapping component 120 maps the color data from the first color space to a second color space.

In the first image processing pipeline 100, color mapping component 120 maps color data from a first color space to a colorant color space so as to generate a color separation. For example, the colorant color space may be a CMYK color space and the color separation may comprise a set of colorant vectors, e.g. each RGB pixel value may be mapped to a CMYK pixel value, wherein the CMYK pixel value denotes a proportion of colorant (e.g. [10, 125, 80] may be mapped to [0.92, 0.0, 0.36, 0.51]). The proportion of each colorant may be represented by a fraction (e.g. 0 to 1) or a percentage (e.g. 0 to 100%). The colorants used within the colorant space may vary depending on a desired printing device, e.g. six colorants may be used in association with a CMYKcm printing device.

The color separation generated by the color mapping component 120 comprises continuous tone data, i.e. each colorant is denoted using a continuous range. In the context of the first image processing pipeline 100, the term "color separation" refers to the output of a color mapping in a colorant space. In certain cases, a color separation may comprise multiple colorant images or components, e.g. one for each colorant in a printing system. For ease of explanation, the term "color separation" will be used herein to refer to the result of combining each of the multiple colorant components, rather than each of the colorant components themselves.

In the first image processing pipeline 100, following the generation of a color separation, a halftoning component 130 applies a halftoning operation to the continuous tone data to generate a halftone output 140. The halftoning operation uses a series of geometric shapes to convert the continuous tone data of the color separation to a discrete tone data, e.g. data comprising a discrete number of color levels. For example, if an image is to be printed on a binary level printing device (e.g. with either 0% or 100% colorant per pixel) then a halftoning component 130 may generate a halftone output with two discrete tone levels per colorant. Typically, a series of dots are used to replicate the continuous tone data, wherein each dot comprises a solid color and a variation in one or more of dot size, dot shape and dot spacing simulates a continuous tone when viewed from a distance.

FIG. 1B shows an example of a second image processing pipeline 150. Like the first image processing pipeline 100, the second image processing pipeline 150 receives image data 160 that is passed into a color mapping component 170. The image data 160 may comprise color data as represented in a first color space, such as pixel representations in an RGB color space. The color mapping component 170 maps the color data from the first color space to a second color space. In contrast to the first imaging pipeline 100, and as discussed in more detail below, the second color space in the second image processing pipeline 150 comprises a Neugebauer Primary area coverage (NPac) color space. In the case f the second image processing pipeline 150, NPac color space is used as a domain within which a color mapping process and a halftoning process communicate, i.e. an output color is defined by an NPac value that specifies a particular area coverage of a particular colorant combination. This is in contrast to the first image processing pipeline 100 wherein color mapping is performed to a colorant vector space, and then halftoning is performed on continuous tone data in the colorant vector space to generate an output image. In contrast, in the second image processing pipeline, a halftone image on a substrate comprises a plurality of pixels or dots wherein the spatial density of the pixels or dots is defined in NPac color space and controls the colorimetry of an area of the image, i.e. any halftoning process simply implements the area coverages as defined in the NPacs. As such, in the context of the second image processing pipeline 150, the term "color separation", referring to an NPac output, combines elements of both a color mapping and halftoning process. An example of an imaging system that uses NPac values in image processing is a Halftone Area Neugebauer Separation (HANS) pipeline.

As described above, certain examples herein are arranged to output color data in a Neugebauer Primary area coverage (NPac) space. An NPac space provides a large number of metamers that facilitate the emulation of a first image processing pipeline that uses separate color mapping to colorant and halftoning processes. An NPac represents a distribution of one or more Neugebauer Primaries (NPs) over a unit area. For example, in a binary (bi-level) printer, an NP is one of 2 k combinations of k inks within the printing system. For example, if a printing device uses CMY inks there can be eight NPs, these NPs relate to the following: C, M, Y, C+M, C+Y, M+Y, C+M+Y, and W (white or blank indicating an absence of ink). Other examples may also incorporate multi-level printers, e.g. where print heads are able to deposit N drop levels, in this case an NP may comprise one of $N^k$ combinations of k inks within the printing system. Although certain printing device examples are described with reference to one or more colorant levels, it should be understood that any color mappings may be extended to other printing fluids such as glosses and/or varnishes that may be deposited in a printing system and that may alter a perceived output color; these may be modelled as NPs.

Figure 2:
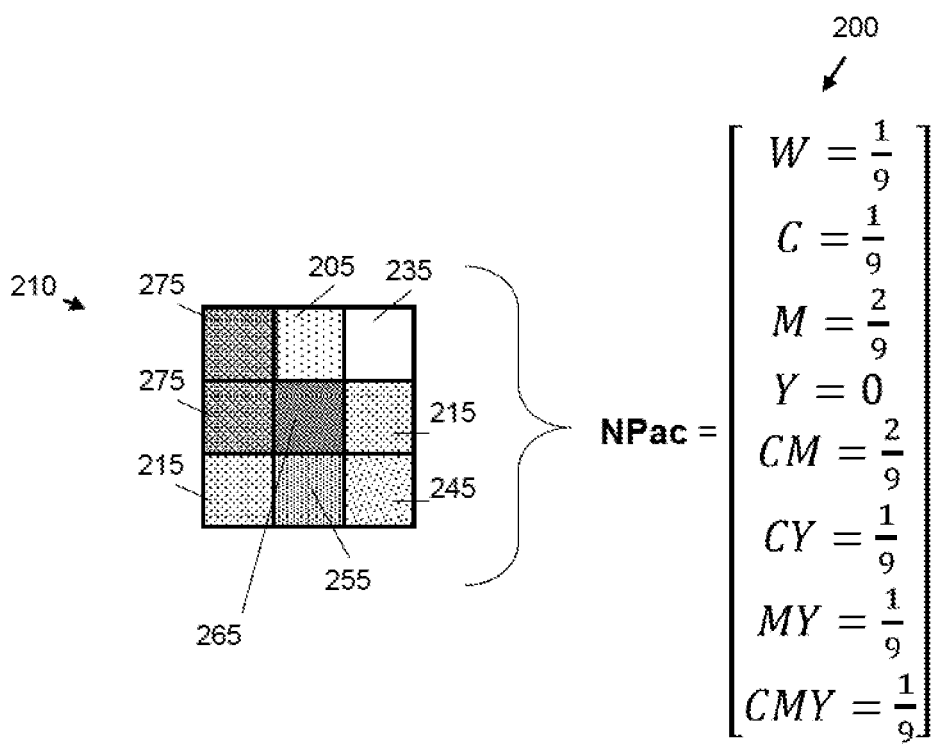
FIG. 2 is a schematic diagram showing a representation of a Neugebauer Primary area coverage vector according to an example.

FIG. 2 shows an example NPac vector 200 for use in a CMY imaging system. This example shows a unit area for an output image that comprises a three-by-three pixel area 210. In implementations the unit area for an NPac may depend on the resolution of the imaging system (e.g. dots per square inch in a printing system). The unit area may be defined as a particular number of printer pixels, e.g as defined by dot resolution. The NPac vector 200 defines the area coverages of the eight NPs for the unit area; for example, in this case: one pixel of White (W) (235); one pixel of Cyan (C) (205); two pixels of Magenta (M) (215); no pixels of Yellow (Y); two pixels of Cyan+Magenta (CM) (275); one pixel of Cyan+Yellow (CY) (245); one pixel of Magenta+Yellow (MY) (255); and one pixel of Cyan+Magenta+Yellow (CMY) (265). As can be seen, the component values of each NPac vector sum to one, i.e. to represent the total area of the unit area.

Figure 4:
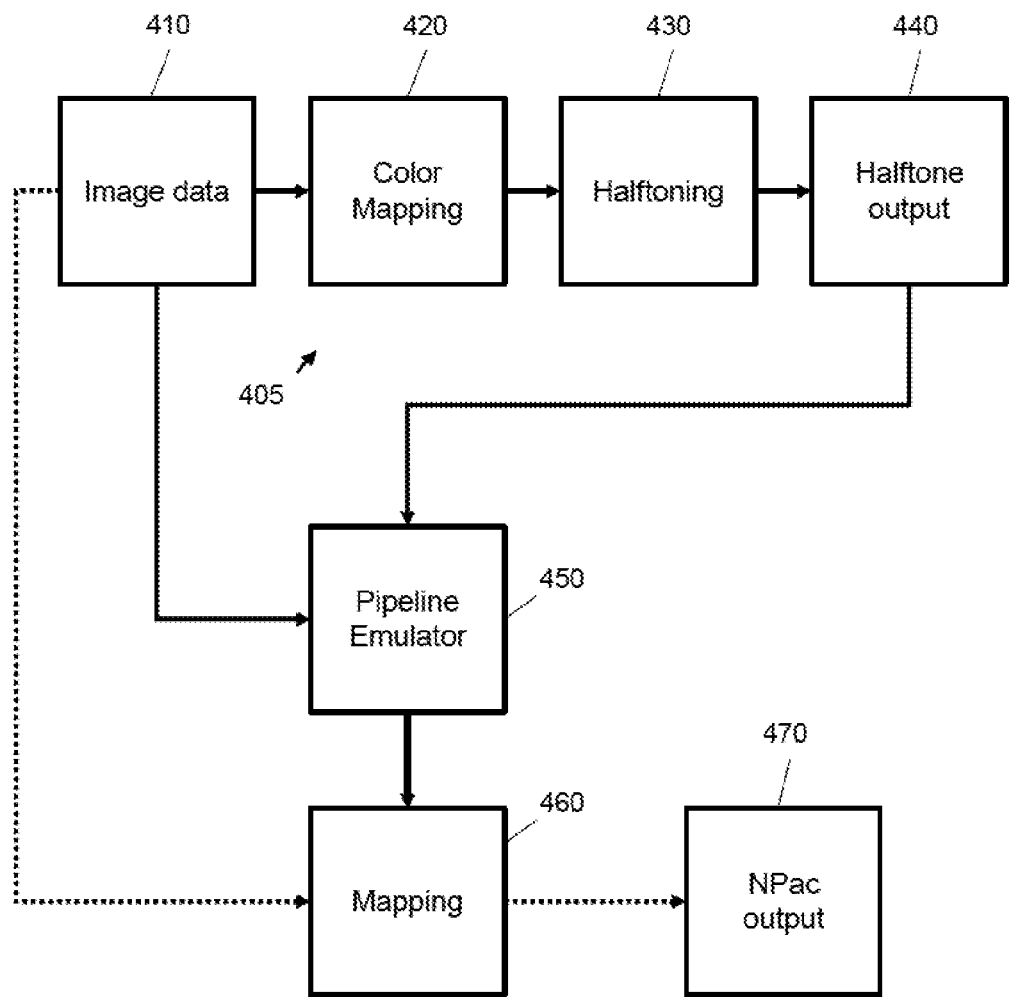
FIG. 4 is a schematic diagram showing certain components for generating a color mapping according to an example.

Although an example three-by-three pixel area is shown in FIG. 4, this is for ease of explanation; the unit area may be of any size and/or there may be multiple levels of units. For example, an n by n millimeter region may comprise a unit area and an imaging device may be arranged to output areas of NP to match an NPac vector definition. In one case, an NPac vector may be approximated for a particular unit area, with any error being diffused or propagated to neighboring unit areas, such that for a given level the error between an output image and an NPac vector is minimized. Likewise, although CMY system is used for ease of explanation, other imaging systems may be used.

Certain examples described herein generate a color mapping that may be used to emulate a color mapping and halftone operation in a first image processing pipeline, i.e. that emulate a color halftone processing pipeline. This enables legacy print pipelines to be emulated by a HANS processing pipeline. It also provides a common mapping space for different color halftone processing pipelines, e.g. by representing different color halftone processing pipelines as color mappings to a common NPac space, the effects of different pipelines may be combined and/or otherwise manipulated.

Figure 3:
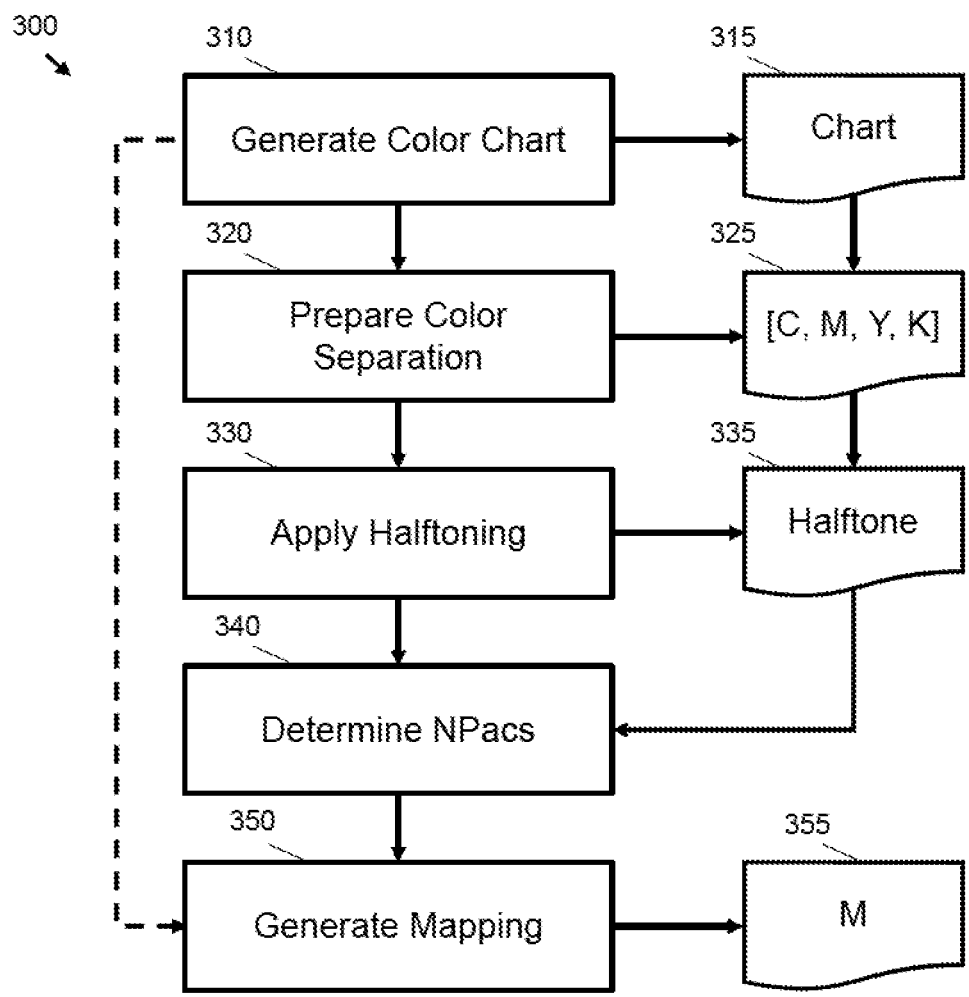
FIG. 3 is a flow chart showing a method for generating a color mapping according to an example.

FIG. 3 shows a method 300 for generating a color mapping representative of a color halftone processing pipeline. At block 310 a color chart 315 is generated. The color chart 315 comprises one or more test patches. Each test patch represents a sampling of a color space of the color halftone processing pipeline, e.g. each test patch may feature a color value that results from the sampling of the color space. The color space of the color halftone processing pipeline may comprise one of a Red, Green, Blue (RGB) color space and a Cyan, Magenta, Yellow and Black (CMYK) color space. The sampling may be a regular sampling of the color space. For example, in one case, a regular sampling may comprise 17 levels in each color channel of a RGB color space, resulting in $17^3$, i.e. 4913 test patch colors. In another case, a regular sampling may comprise 9 levels in each colorant channel of a CMYK color space, resulting in $9^4$, i.e. 6561 test patch colors. The level of the sampling may be selected based on available resources and the requirements of any particular implementation. Each test patch is arranged to have a sufficient pixel count so as to accurately measure any halftone output. In one implementation a 128 by 128 pixel square is sufficient. In the context of FIG. 1A, the color chart 315 may be generated as image data 110 for processing by the first image processing pipeline 100.

At block 320 in FIG. 3, a color separation 325 for the color chart is prepared using the color halftone processing pipeline. For example, in the context of FIG. 1A, color mapping component 120 may receive the color chart 315 as image data 110 and generate continuous tone data for each of a number of colorants. In FIG. 3, the color separation 325 is shown as having CMYK components, i.e. comprises continuous tone data in CMYK colorant space. Other examples may use greater or fewer colorants, e.g. in another example color separation 325 may be CMYKcm continuous tone data that is generated from RGB continuous tone data. At block 330, a halftoning operation is applied to the color separation 325 using the color halftone processing pipeline to generate a halftone output 335. For example, in the context of FIG. 1A, the halftoning component 130 may receive continuous tone data representative of color separation 325 and apply one of more halftone screens to output halftone, e.g. discrete tone, data. In certain cases the halftone output 335 may comprise data indicative of colorant drop states per halftone pixel, e.g., whether one or more of CMYK printer pens are to fire a drop in respect of a particular substrate area. The output of blocks 310 to 330 is thus a halftone representation of a color chart including a number of test patches.

At block 340 in FIG. 3, the halftone output 335 is processed to determine one or more NPac values. This may comprise, for one or more selected test patches, determining printing-fluid drop-state statistics for the selected test patch. In certain case, the drop-state statistics may comprise Neugebauer Primary (NP) proportions for a predetermined test patch area. In one case, an NPac vector is determined for each test patch in the color chart. At block 350, these determined NPac values are used to generating a color-space-to-NPac color mapping 355. For example, if the sampled color values that are used to generate the test patches of the color chart are known then these can be mapped to the determined NPac values for each test patch. In FIG. 3, the dashed line between blocks 310 and 350 represents the use of known sampled color values in the generation of the color mapping. However, in other cases, the sampled color values may be determined based on a known sampling rate.

The output of the method 300 of FIG. 3 is a color mapping between color values in an input color space and NPac values. With reference to FIG. 1A, the color mapping represents the actions of the color mapping component 120 and the halftoning component 130 of the first image processing pipeline 100. As such, the color mapping may be used by the color mapping component 170 of the second image processing pipeline 150 to produce an NPac output 180 that, in color terms, emulates the halftone output 140 of the first image processing pipeline 100. Typically, the input color space is that of image data 110 and 160, e.g. a RGB or CMYK color space. The color mapping may be provided by a look-up table with one or more nodes, wherein each node represents the mapping from a particular input color values to a particular output NPac values. For the examples with 17 and 9 sampling levels, the resultant look-up tables would respectively comprise 4913 and 6561 nodes.

If the output of FIG. 3 is a look-up table, then at the nodes of the look-up table the halftone statistics of the second image processing pipeline 150 will match the halftone statistics of the first image processing pipeline 100. The precise pattern used by the halftoning component 130 of the first image processing pipeline 100 will not be matched, as this depends on the algorithm used by the second image processing pipeline to implement the NPac values, e.g. to distribute the NPs over a unit area. However, the color properties will be matched. In certain cases, there may be differences between the first and second image processing pipelines between the nodes of the generated look-table. This may be because interpolation, whether linear or otherwise, is used to implement a particular mapping between look-up table nodes. In these cases, increasing the number of sampling levels will increase the number of nodes and thus the mapping accuracy, e.g. $33^3$ nodes for an RGB color space may provide more accurate matching (35937 test patches). In other cases, a mapping may be accurate, in so far as human perception allows, at lower sampling levels, e.g. suitably accurate matching may be provided with $5^3$ nodes for an RGB color space in certain cases (125 test patches). A relatively low resolution look-up-table may be sufficient because of the optical linear averaging that occurs in the human visual system. Given two nodes with their respective NPacs, any intermediate node is simply a convex combination of these NPacs, which in turn is an NPac itself and the resulting pattern is a spatially and proportionally weighed distribution of the respective ink-overprints (or NPs) of the constituting NPacs at the appropriate proportions determined by the convex weights.

The sizes of the test patches used in a particular implementation may depend on a number of factors. A first factor may be the accuracy of colorant representations in the color halftone processing pipeline. For example, the first image processing pipeline 100 may encodes colorant vectors at a particular bit level, e.g. continuous tone data may be represented using 8, 12 or 16 bits (one of 256, 4096 or 65536 levels). The higher the accuracy the larger the patch should be, for example for an 8 bit encoding the smallest theoretically feasible patch is 16×16 pixels since there would be 256 pixels allowing for the possibility of each value to be represented. Likewise for a 10 bit precision the smallest size would be 32×32 etc. A second factor is the accuracy of the NPac representations, e.g. whether an NPac value is represented using 8, 12 or 16 bits. A third factor may be a threshold matrix used by the second image processing pipeline and/or its bit-depth. A threshold matrix is a matrix of continuous tone values of a given bit-depth (e.g. 8, 12 or 16 bits) whereby every value is distributed over the matrix with the same, constant probability. An example is a 'white noise' uniform random threshold matrix subject to the constraint that, e.g. for a 64×64 patch at a 12 bit precision every value from 0 to 4095 occurs exactly once in the matrix. Threshold matrices may be designed with several additional constraints in mind, such as clustering values continuously together, resulting in a cluster-dot or AM-screen halftone pattern. In general, a test patch is selected to have a size that is sufficiently big for it to contain a representative set of the NPs that would be placed into it by the first image processing pipeline 100.

In one case, determining a set of NPac values comprises printing the halftone output 335 to generate a print output. This print output may then be measured, e.g. using a color scanning device, colorimeter and/or spectrometer, to determine drop-state statistics and/or colorimetry from the print output. In another case, drop-state statistics may be measured from the halftone output, e.g. directly from data representing a "print-ready" halftoned image.

FIG. 4 shows an example of a pipeline emulator 450 that may be used to emulate a color halftone processing pipeline 405. FIG. 4 shows two components of the color halftone processing pipeline 405: color mapping component 420 receives image data 410, generates continuous tone data that is received by halftoning component 430 that applies a halftone operation to generate a halftone output 440. In this manner, elements 410 to 440 are similar to components 110 to 140 in FIG. 1A. The pipeline emulator 450 is arranged to receive the halftone output 440 from the color halftone processing pipeline 405 and generate a mapping for a color mapping component 460. The color mapping component 460 converts image data 110 to an NPac output 470 using the mapping, wherein the perceived colors in the NPac output 470 match those of the halftone output 440. Once the mapping is generated the color mapping component 460 may independently map image data 410 to an NPac output 470, i.e. the mapping may be used to emulate the color halftone processing pipeline in a separate processing pipeline such as a HANS pipeline.

Figure 5:
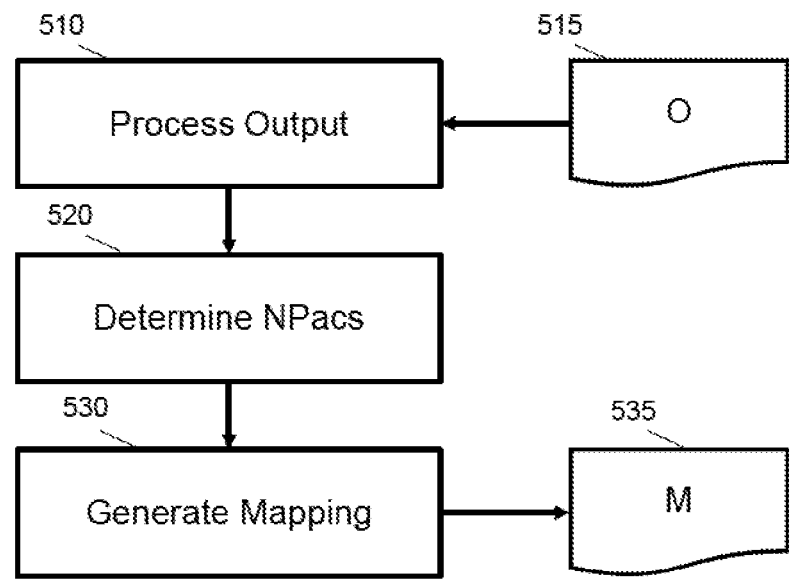
FIG. 5 is a flow chart showing another method for generating a color mapping according to an example.

FIG. 5 shows a flow diagram of another method 500 of generating a color mapping. At block 510 a halftone output 515 from a color halftone processing pipeline is processed. The halftone output 515 is the result of applying the color halftone processing pipeline to predetermined input image data. The color halftone processing pipeline comprising applying a halftoning operation to continuous-tone colorant data. At block 520 a set of NPac values are derived from the halftone output 515. Block 520 may comprise measuring a set of NPac values present in a printed output generated using the halftone output 515. At block 530, generating a color-space-to-NPac color mapping is generated based on the determined NPac values and the predetermined input image data. For example, if an area of an input image is known to have a particular RGB color value and an NPac value is measured for the same area in a printed output, then a mapping from the RGB color value to the NPac value may be stored.

Certain examples described herein enable a pre-existing color pipeline involving separate color separation and halftoning stages to be emulated within a HANS pipeline. Certain examples described herein involve creating a regular grid of continuous tone values, passing them through an existing ink-vector-based pipeline, applying halftoning, then taking a halftone output and expressing each portion of the grid as an NPac value. The result is a color mapping, for example in the form of an RGB or CMYK to NPac look-up table, that may be applied to image data to recreate the color output of the pre-existing color pipeline. Certain examples thus allow interoperability between color processing pipelines that utilize separate color separation and halftoning stages and color processing pipelines that use NPac color representation& This enables colorant or ink-vector color separations, whose color may be affected by a halftoning process, to be uniquely defined in NPac color space. This is possible as the NPac representation sets area coverage parameters for a unit area, hence any later halftoning process simply implements these spatial distributions without changing a color as defined using a NPac vector. This in turn also allows the outputs of different color processing pipelines to be combined and manipulated in a common color space. It also enables benefits such as interpolation in an area coverage domain, and parallelized and/or parametrizeable single-matrix halftoning.

Certain examples described herein relate to an imaging system comprising a look-up table. For example, color mapping 170 may be implemented using a look-up table generated according to the methods of any one of FIGS. 3 and 5. The look-up table comprises a plurality of nodes, each node being configured to map a color value in a color space to an NPac vector in an NPac space. In this case, the imaging system is arranged to process an input image using the look-up table and generate a halftone output comprising one or more NPac vectors; a color mapping of each node is representative of a color halftone processing performed by an alternative imaging system, the alternative imaging system being configured to process an input image to generate continuous-tone color data and to apply a halftoning operation to the continuous-tone color data to generate a halftone output.

Figure 6:
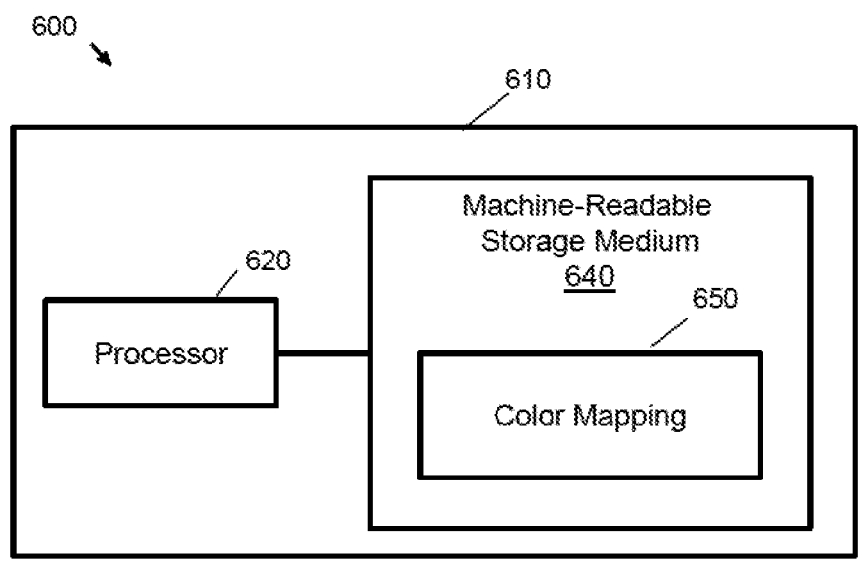
FIG. 6 is a schematic diagram showing a processing device according to an example.

Certain methods and systems as described herein may be implemented by a processor that processes computer program code that is retrieved from a non-transitory storage medium. FIG. 6 shows an example 600 of an imaging system 610 comprising a machine-readable storage medium 640 coupled to a processor 620. In certain case the imaging system 610 may comprise a computer; in other cases the imaging device may comprise a printer, scanner, display device or the like. Machine-readable media 640 can be any media that can contain, store, or maintain programs and data for use by or in connection with an instruction execution system. Machine-readable media can comprise any one of many physical media such as, for example, electronic, magnetic, optical, electromagnetic, or semiconductor media. More specific examples of suitable machine-readable media indude, but are not limited to, a hard drive, a random access memory (RAM), a read-only memory (ROM), an erasable programmable read-only memory, or a portable disc. In FIG. 6, the machine-readable storage medium comprises program code to implement a color mapping 650 such as the above look-up table. In certain cases, the machine-readable storage medium may comprise program code to implement a color mapping generator that, in use, performs one or more of the methods described above.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method of generating a color mapping representative of a color halftone processing pipeline comprising:
   generating, by a processor, a color chart comprising test patches, each test patch representing a sampling of a color space of the color halftone processing pipeline;
   generating, by the processor, a color separation for the color chart using the color halftone processing pipeline, the color separation comprising continuous tone data in a colorant space;
   applying, by the processor, a halftoning operation to the continuous tone data of the color separation to generate a halftone output;
   for each of selected test patches in the halftone output, determining Neugebauer Primary area coverage (NPac) values for the selected test patch;

generating, by the processor, a color-space-to-NPac color mapping based on the determined NPac values for each of the selected test patches; and printing the halftone output to generate a print output; and measuring, by the processor, the print output to determine drop-state statistics for the NPac values.

2. The method of claim 1, wherein determining the NPac values comprises determining printing-fluid drop-state statistics for the selected test patch, the drop-state statistics comprising Neugebauer Primary (NP) proportions for a predetermined test patch area.

3. The method of claim 1, wherein the color space comprises a Red, Green, Blue (RGB) color space or a Cyan, Magenta, Yellow and Black (CMYK) color space.

4. The method of claim 1, wherein generating the color-space-to-NPac color mapping comprises generating a look-up table that maps a sampled color value in the color space to an NPac vector.

5. The method of claim 1, wherein each test patch in the color chart represents a color value obtained from a regular sampling of the color space, and wherein determining the NPac values is repeated for each of the test patches.

6. The method of claim 1, wherein the halftone output comprises data indicative of colorant drop states per halftone pixel.

7. The method of claim 1, wherein determining the NPac values comprises: determining the drop-state statistics from the halftone output.

8. The method of claim 1, comprising:
using the color-space-to-NPac color mapping to emulate the color halftone processing pipeline in a Halftone Area Neugebauer Separation (HANS) pipeline.

9. A method of generating a color mapping comprising:
generating, by a processor, a color separation for a color chart of predetermined input image data, wherein the color separation comprises continuous tone data in a colorant space;
applying, by the processor, a halftoning operation to the continuous tone data of the color separation using a color halftone processing pipeline to generate a halftone output;
determining, by the processor, Neugebauer Primary area coverage (NPac) values for the halftone output;
generating, by the processor, a color-space-to-NPac color mapping based on the determined NPac values for the halftone output;
printing the halftone output; and
measuring, by the processor, the printed halftone output to determine drop-state statistics for the NPac values.

10. The method of claim 9, comprising:
using the color-space-to-NPac color mapping to emulate the color halftone processing pipeline in a Halftone Area Neugebauer Separation (HANS) pipeline.

11. The method of claim 9, wherein generating the color-space-to-NPac color mapping comprises generating a look-up table that maps a color value from input image data to an NPac vector.

12. The method of claim 9, wherein the input image data comprises a Red, Green, Blue (RGB) color data or a Cyan, Magenta, Yellow and Black (CMYK) color data.

13. An imaging system comprising:
a processor; and
a non-transitory machine-readable storage medium storing instructions that when executed cause the processor to:
generate a color separation for a color chart of a color space, wherein the color separation comprises continuous-tone color data,
apply a halftoning operation to the continuous-tone color data of the color separation using a color halftone processing pipeline to generate a halftone output,
determine Neugebauer Primary area coverage (NPac) values for the halftone output,
generate a color-space-to-NPac color mapping based on the determined NPac values for the halftone output,
cause the halftone output to be printed, and
measure the printed halftone output to determine drop-state statistics for the NPac values.

14. The imaging system of claim 13, wherein the color space comprises a Red, Green, Blue (RGB) color space and the continuous-tone color data comprises Cyan, Magenta, Yellow and Black (CMYK) based colorant data.

15. The imaging system of claim 13, wherein the instructions are executable to cause the processor to utilize the color-space-to-NPac color mapping to map a color value of input image data to an NPac vector.

* * * * *

UNITED STATES PATENT AND TRADEMARK OFFICE
CERTIFICATE OF CORRECTION

PATENT NO. : 10,291,822 B2  
APPLICATION NO. : 15/305455  
DATED : May 14, 2019  
INVENTOR(S) : Jan Morovic et al.

Page 1 of 1

It is certified that error appears in the above-identified patent and that said Letters Patent is hereby corrected as shown below:

On the Title Page

Item (72), Inventors, Line 5, delete "San Cugat del Valles" and insert -- Sant Cugat del Valles --, therefor.

Signed and Sealed this  
Twenty-ninth Day of October, 2019

Andrei Iancu  
*Director of the United States Patent and Trademark Office*